2 Sheets—Sheet 1.

J. I. HOKE.

SULKY PLOW.

No. 9,796.

Reissued July 12, 1881.

Witnesses;

J. Walter Fowler,

R. C. Evans

Inventor;

Jno. I. Hoke by A. H. Evans & Co

Attys

N. PETERS, Photo-Lithographer, Washington, D. C.

2 Sheets—Sheet 2.

J. I. HOKE.

SULKY PLOW.

No. 9,796.

Reissued July 12, 1881.

Witnesses;
T. Walter Fowler,
R. K. Evans

Inventor;
Jno. I. Hoke
by A. H. Evans & Co.
Attys

N. PETERS, Photo-Lithographer, Washington, D. C.

UNITED STATES PATENT OFFICE.

JOHN I. HOKE, OF SOUTH BEND, INDIANA.

SULKY-PLOW.

SPECIFICATION forming part of Reissued Letters Patent No. 9,796, dated July 12, 1881.

Original No. 230,014, dated July 13, 1880. Application for reissue filed May 13, 1881.

*To all whom it may concern:*

Be it known that I, JOHN I. HOKE, a citizen of the United States, residing at South Bend, in the county of St. Joseph and State of Indiana, have invented certain new and useful Improvements in Sulky-Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in sulky-plows, and the objects of my improvements are, first, to provide devices for locking the tongue in a proper position for plowing and for unlocking it when the plow is to be turned around; second, to provide the requisite means for controlling the position of the point of the plow so that it may enter the earth to a uniform depth, whether used in hard or soft ground; third, to provide the requisite devices for regulating the width of the furrow turned by the plow. I attain these objects by the mechanism illustrated in the accompanying drawings, in which—

Figure 1:
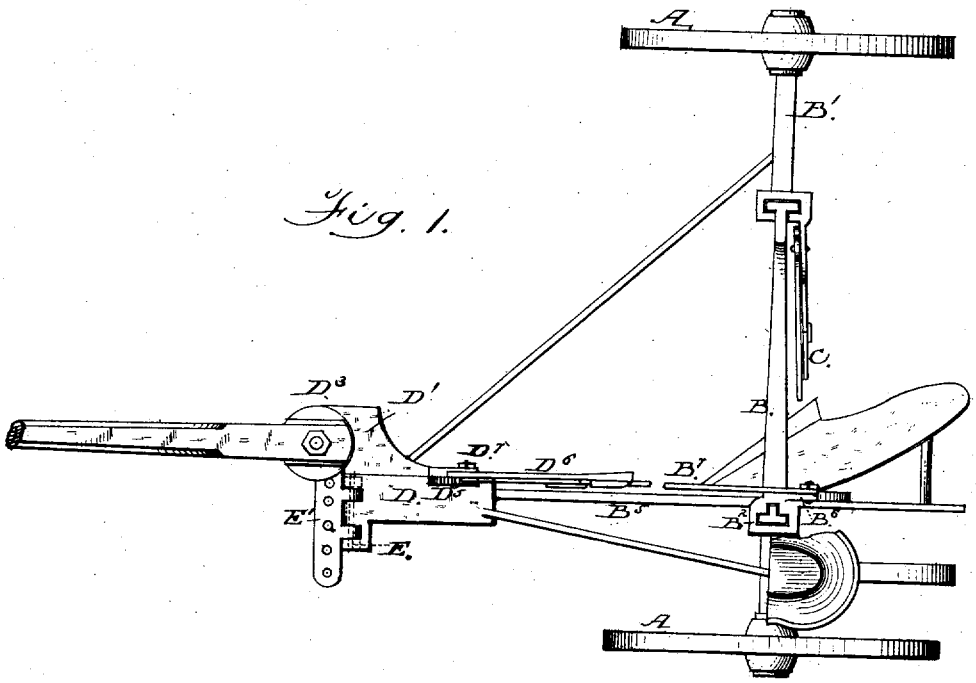
Figure 2:
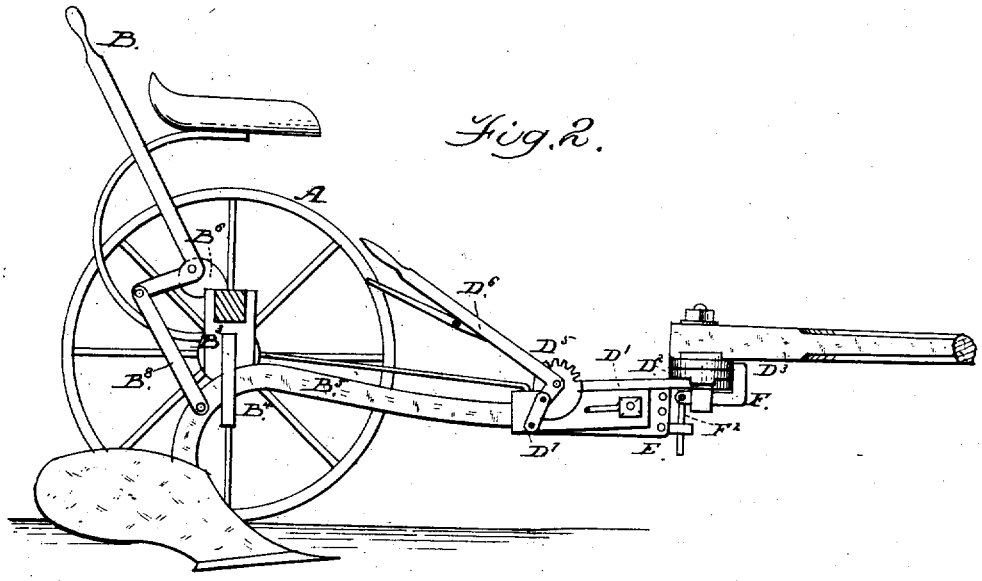
Figure 3:
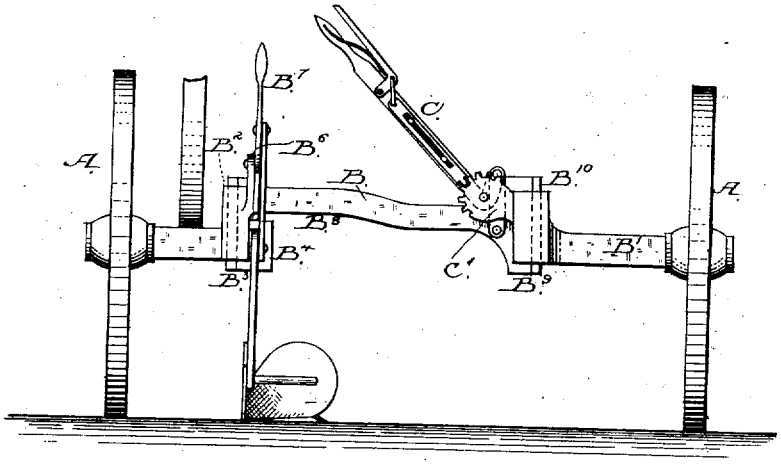
Figure 4:
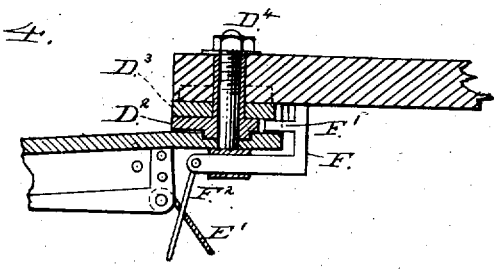
Figure 5:
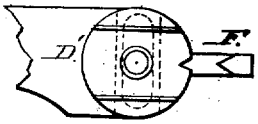
Figure 6:
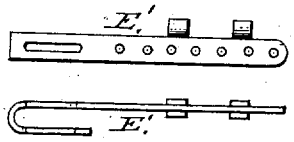

Figure 1 is a plan view of a sulky-plow, showing the wheels, the jointed axle, the slide for adjusting the depth of the plow in the earth, the devices for regulating the position of its point in hard and soft ground, the plow, a portion of the tongue, and the device for automatically locking and unlocking it. Fig. 2 is a sectional elevation, showing the parts above enumerated. Fig. 3 is a rear view, showing the means of adjusting the sections of the axle and for regulating the depth of the plow in the earth. Fig. 4 is a detached view, showing the devices for attaching the tongue to the beam and for latching it thereto, the devices to which the team is attached, and the devices for automatically latching and unlatching the tongue. Fig. 5 is a section showing the plates to which the tongue is attached, and a portion of the latch which holds it in position; and Fig. 6 is a plan and side view of the clevis, to which the power for driving the plow is attached.

Similar letters refer to similar parts throughout the several views.

In constructing a sulky-plow with my improvements applied thereto, I use two wheels, A A, of any approved form and material. These wheels are allowed to turn freely upon their axle and are held thereon by means of a nut screwed upon said axle or in any other manner.

The axle consists of two sections, B and B′, that lettered B passing through the wheel and inward therefrom to the point where it joins section B′. Near the wheel-seat of B there is provided a vertical arm, $B^2$, in which there is formed a T-shaped slot or groove, and in which there is placed a slide, $B^3$, which has upon its inner surface a loop, $B^4$, through which the beam $B^5$ of the plow passes, and by which the rear end of said beam and the plow proper are carried.

To the upper portion of arm $B^2$ of the axle there is affixed a lug, $B^6$, to which there is pivoted a lever, $B^7$, to the short arm of which a link, $B^8$, is attached, the opposite end of which is pivoted to the beam $B^5$. The lever $B^7$ being near the seat of the operator, he can at any time change the position of its outer end by raising or lowering it, and thus cause the slide $B^3$ and loop $B^4$ to be lowered or raised and the depth of the furrow regulated in ordinary ground.

From the arm $B^2$, above described, the section B of the axle extends to a point about midway between the wheels A A, where it is provided with a vertically-arranged T-shaped end, $B^9$, as shown in Fig. 1. At this point it joins section B′ of the axle, which, at its inner end, is provided with an arm, $B^{10}$, and with a groove which receives the end of arm B. To the section B, near where it joins B′, there is affixed a lug, to which a lever, C, is pivoted, the short arm of which carries a link, C′, the lower end of which is secured to the section B of the axle in the manner shown in Fig. 3. The lever C is provided with a sliding dog, which engages with a toothed sector formed on section B′ of the axle, the arrangement of the parts last described being such that the operator can raise or lower section B′ of the axle by changing the position of lever C, and thus place a greater or less amount of weight upon the different wheels of the plow without changing the position thereof in the earth.

In making provision for controlling the position of the point of the plow, and thus its tendency to run deeper in soft than in hard earth, there is attached to the forward end of the beam a bracket, D, which has pivoted to it a plate, D′, in the upper surface of which there is a transverse groove. (Shown in Fig. 2.) Into this groove there is fitted a projection formed upon a disk, which is capable of being moved laterally in said groove. Upon the top of disk $D^2$ there is placed another disk, $D^3$, upon the upper surface of which there are formed ribs between which the end of the tongue passes, as shown in Figs. 1 and 4.

For the purpose of holding the devices just alluded to and the tongue of the machine in their proper positions on the plate D′, a bolt, $D^4$, is passed through them. This arrangements of parts provides the necessary means for regulating the width of the furrows by adjusting the parts upon the plate and securing them in their adjusted positions by the bolt $D^4$, the wider furrow being cut by sliding the disks and the tongue of the machine to the right, and the narrower by sliding them to the left.

Upon the upper surface of the plate D′ there is formed or affixed a toothed sector, $D^5$, to which is pivoted a lever, $D^6$, the short arm of which carries a link, $D^7$, the lower end of which is attached to the pivoted plate D′, which turns upon a bolt passing through it and the vertical flange of bracket D. The arrangement of these parts is such that upon approaching hard earth the operator can, by pressing backward the upper end of lever $D^6$, force the point of the plow downward, and thus cause it to enter the earth to the same depth that it did in softer ground, and upon coming to the softer parts of the field he can, by changing the lever to its former position, prevent the plow from entering too deep, the lever being furnished with a latch for holding it in its adjusted position.

Another important feature of my improvements consists in the means employed for enabling the operator to turn the plow around by the direct draft of the horses, instead of pushing it around by pressing against the tongue, as is usual. For the accomplishment of this object there are formed upon the under surface of the bracket D downwardly-projecting arms E E, which are provided with holes for the adjustment therein of a peculiarly-formed clevis, E′, which consists of a bar of metal with ears projecting from its rear edge, which have holes through them for attaching it to the arms of bracket D. A view of this device is shown in Fig. 6.

When the plow is in use the double-tree is attached to the clevis, and consequently when said plow is being drawn forward the clevis is drawn up into the position shown in Fig. 1, but upon arriving at the end of the furrow, and the draft being stopped, it will fall down into the position shown in Fig. 4. This device is made to operate a slide, F, for holding the tongue in line with the path of the machine when in motion, and for releasing the same when turning round, so that said tongue may be placed at a right or any other angle thereto made necessary in turning. For the accomplishment of this purpose there is formed in the head of bolt $D^4$ a passage through which the lower horizontal portion of slide F passes, its vertical portion being provided with a short horizontal projection, F′, which enters a notch in the disk $D^2$, which prevents the bolt from turning around. Just above the portion F′ there is formed a wedge-shaped projection on slide F, which, when the plow is being drawn forward, enters a notch formed in the disk to which the tongue is fastened, but which, when the strain is relieved, falls back and allows the tongue to be turned, as above stated. This slide F is operated by means of a pin or stud, $F^2$, which is made to project therefrom down through a slot formed in the end of clevis E′, the arrangement being such that when force is being applied to draw the plow forward the clevis will be drawn up into a horizontal position, which will have the effect to press the slide F forward and lock the tongue in a line with the path of the machine; but when the force ceases to be applied the clevis will fall down into an angular position, which will carry the slide rearward and unlock said tongue and leave it free to turn at a right or any angle to its former position, and thus allow the plow to be turned by the draft of the animals, as above stated.

Having thus described my improvements, what I claim, and desire to secure by Letters Patent, is—

1. In a sulky-plow, a clevis, a latch, and a catch, constructed and arranged for joint operation with a revolving tongue, substantially as described, whereby the tongue will remain in its normal position when the draft power is applied, and will be automatically unlocked so as to revolve when said power is not applied.

2. In combination with the beam of a plow, a bracket, D, an adjustable plate, D′, a lever, $D^6$, and link $D^7$, the parts being arranged for operation substantially as described, whereby they may be made to give the proper dip or position to the point of the plow, and to regulate the same with reference to hard and soft ground, as described.

3. The combination of the adjustable plate D′, having a groove in its upper surface, the disk $D^2$, having a projection upon its under surface, and the bolt $D^4$, whereby the width of the furrow cut by the plow can be regulated by a transverse movement of the disk upon the plate, as described.

In testimony whereof I affix my signature in presence of two witnesses.

JOHN I. HOKE.

Witnesses:
E. B. KERNS,
JAS. DU SHANE.